UNITED STATES PATENT OFFICE.

HEINRICH BAUM, OF FRANKFORT-ON-THE-MAIN, ASSIGNOR TO DR. F. VON HEYDEN NACHFOLGER, OF RADEBEUL, GERMANY.

DITHIOSALICYLIC ACID.

SPECIFICATION forming part of Letters Patent No. 416,318, dated December 3, 1889.

Application filed May 25, 1889. Serial No. 312,140. (Specimens.) Patented in Germany January 28, 1888, No. 46,413, and in Belgium October 11, 1888, No. 83,564.

*To all whom it may concern:*

Be it known that I, HEINRICH BAUM, a subject of the Emperor of Germany, and a resident at Frankfort-on-the-Main, Germany, have invented new and useful Improvements in Medical Compounds, (for which I have obtained Letters Patent of the Empire of Germany, No. 46,413, dated January 28, 1888, and Letters Patent of the Kingdom of Belgium, No. 83,564, dated October 11, 1888,) of which the following is a specification.

The invention has for its object the production of a new chemical product, the physiological (antiseptic) action of which is like that of salicylic acid, but is still better than the latter.

The new product is called "dithiosalicylic acid," and is obtained in the following manner: In a suitable vessel about sixty-eight parts, in weight, of protochloride of sulphur are heated at a temperature of 120° to 150° centigrade, with about one hundred and thirty-eight parts, in weight, of salicylic acid, when a strong evolution of hydrochloric acid takes place. The heating is continued until the evolution of hydrochloric acid has ceased, when the dithiosalicylic acid is obtained, according to the following formula:

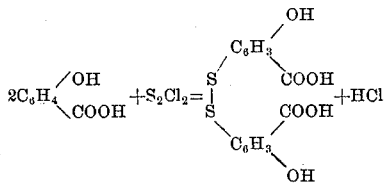

In lieu of the protochloride of sulphur, bromide or iodide of sulphur can be used.

The new product has the following properties: It is a friable light straw-yellow mass, which melts in a similar manner to resin. It is insoluble in water, but easily soluble in alcohol, ether, and benzole, and while it is itself insoluble in water its salts are easily soluble therein. Such a dithiosalicylic compound—as, for instance, the dithiosalicylate of sodium—has a dirty yellow color, and can by means of a proper precipitant be separated into two isometric bodies. The one of these isomers is a yellow powder, which is insoluble in alcohol and can be precipitated out of its watery solution by means of common salt, while the other is a dirty white mass, which is soluble in alcohol and cannot be precipitated out of its watery solution by common salt. This different behavior of the two isomers shows the way in which they can be separated one from another. These isomers, either mixed or each separate, have the same physiological (antiseptic) properties as the acid, and as they are soluble in water, while the acid is insoluble, the latter is employed only exceptionally as such, but will preferably be employed in form of its described isomeric salts either separately or mixed.

Having thus described my invention and the manner of employing the same, what I claim as my invention and wish to have secured to me by Letters Patent of the United States of America, is—

The described product, dithiosalicylic acid, having the general formula $C_{14}H_{10}S_2O_6$, and being a friable straw-yellow mass, which melts as a resin and which is not soluble in water, but easily soluble in alcohol, ether, and benzole.

In testimony whereof I have signed my name to this specification in the presence of two subscribing witnesses.

HEINRICH BAUM.

Witnesses:
 FRANZ HASSLACHER,
 JOSEPH PATRICK.